T. S. TAYLOR.
Printer's Type-Measure.
No. 208,346. Patented Sept. 24, 1878.
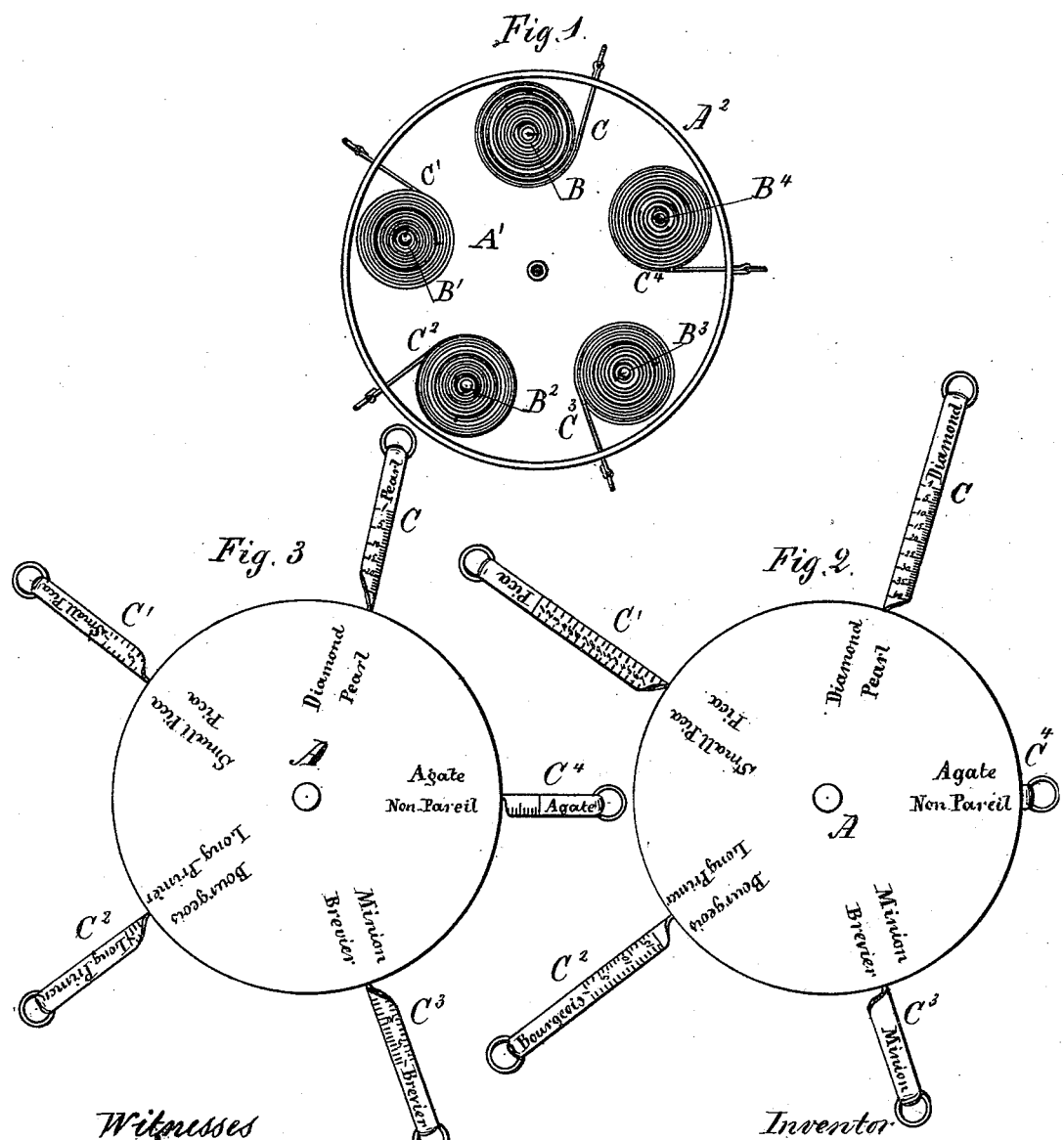

UNITED STATES PATENT OFFICE.

THOMAS S. TAYLOR, OF FORT WAYNE, INDIANA.

IMPROVEMENT IN PRINTERS' TYPE-MEASURES.

Specification forming part of Letters Patent No. 208,346, dated September 24, 1878; application filed August 24, 1878.

*To all whom it may concern:*

Be it known that I, THOMAS S. TAYLOR, of Fort Wayne, in the county of Allen and State of Indiana, have invented certain new and useful Improvements in Printers' Tools; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to an improved scale for printers' use for measuring the spaces to be occupied by type in printing.

It is well known that the "ems" or units of measure in calculating the amounts of printed matter are of different dimensions, varying with the size of type which they represent.

To estimate accurately an amount of printing it is necessary that the printer should have at hand a number of scales corresponding to the several styles and sizes of types to be employed, there being ten sizes of type in ordinary use.

Hitherto this operation of calculating has been effected by means of rods having several sides, provided with graduated scales, or by means of graduated strips of paper, both of which methods are subject to difficulty and inconvenience, and the devices are liable to become inaccurate from wear and soiling.

It is the object of my invention to produce a printers' measure which shall be more convenient, accurate, and durable than those now in use; and to these ends it consists of parts to be hereinafter described.

Figure 1 is an inside view of my improved printers' measure. Figs. 2 and 3 are plan views, respectively, showing opposite sides of the tapes when they are withdrawn from the casing.

In the drawings, A represents the top, $A^1$ the bottom, and $A^2$ the annular wall, of a cylindrical shell or casing.

B $B^1$ $B^2$ $B^3$ $B^4$ represent coiled springs, of which there are preferably five, as shown in the drawings, situated within the casing A $A^1$ $A^2$.

C $C^1$ $C^2$ $C^3$ $C^4$ are tapes wound upon said coiled springs, respectively. Upon these tapes are printed the graduated scales necessary to measure the different styles of type, each side of each tape being provided with a different scale. Upon each tape are also printed the names of the type to whose measurement it is adapted.

Thus, as shown in Fig. 2, the tape C is provided upon one side with a scale for measuring that style of type known as "diamond;" and in Fig. 3 the same tape is shown to be provided upon its other side with a scale for measuring that style of type called "pearl." Each of the other tapes is similarly provided with two separate scales.

In order to assist the operator to instantly draw out the required tape, I place upon the top plate A of the casing and on the respective sides of each tape the names of the type which that tape is adapted to measure.

I make these measures of such size as to enable the printer to carry in his pocket within a tight casing all of his peculiar scales, and thus avoid the trouble and inconvenience incident to the large and cumbrous printers' measures now employed; and as the tapes when not in use are concealed and covered within the shell or casing, they are not liable to be impaired by the ink or other soil on the operator's hands.

What I claim is—

A printer's type-measure having two or more tapes, each tape provided on each side with a different type-scale, in combination with a casing, within which all of said tapes are attached and concealed, substantially as and for the purposes set forth.

In testimony that I claim the foregoing as my own I affix my signature in presence of two witnesses.

THOMAS S. TAYLOR.

Witnesses:
JAMES LAWRENSON,
H. H. BLISS.